(No Model.)
T. GLOVER & T. J. JEAN.
LUBRICATOR.
No. 490,247. Patented Jan. 17, 1893.
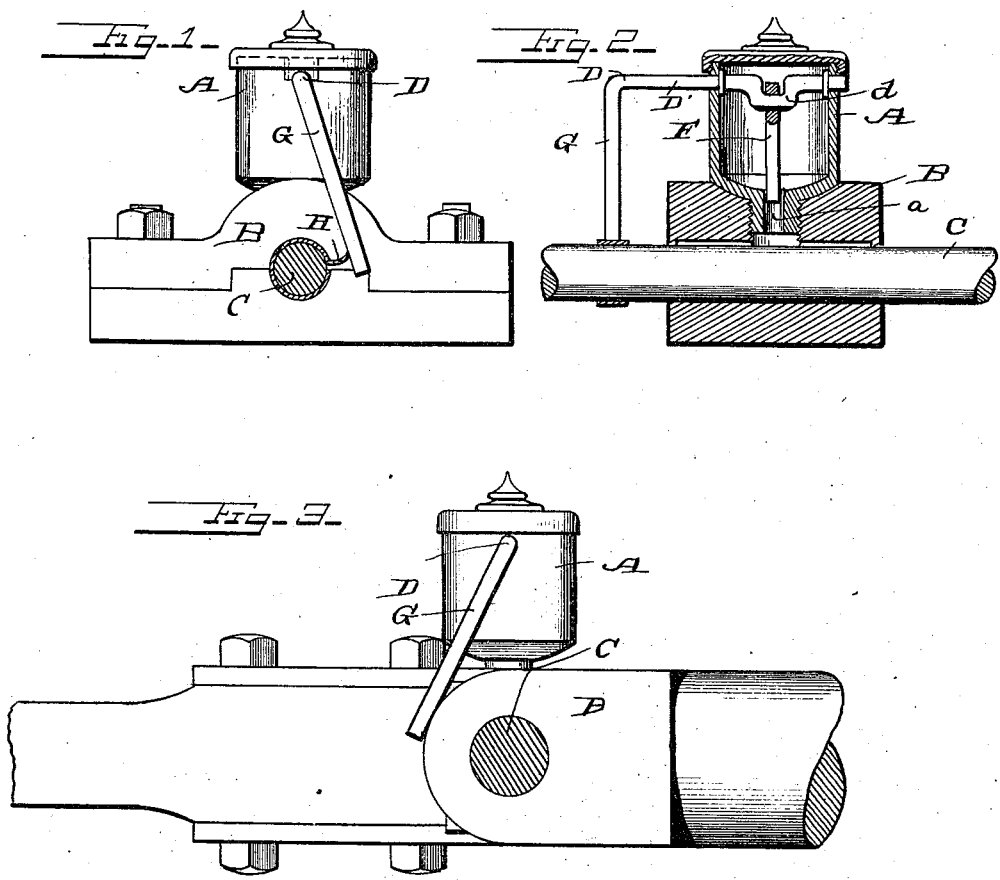
Witnesses
Jesse Heller.
Philip C. Masi.
Inventors
Taylor Glover,
Thomas J. Jean.
by C.W. Anderson
their Attorney

UNITED STATES PATENT OFFICE.

TAYLOR GLOVER AND THOMAS J. JEAN, OF MARYVILLE, MISSOURI; SAID JEAN ASSIGNOR TO LARK P. BONEBRAKE, OF SAME PLACE.

LUBRICATOR.

SPECIFICATION forming part of Letters Patent No. 490,247, dated January 17, 1893.

Application filed March 23, 1892. Serial No. 426,176. (No model.)

*To all whom it may concern:*

Be it known that we, TAYLOR GLOVER and THOMAS J. JEAN, citizens of the United States, residing at Maryville, in the county of Nodaway and State of Missouri, have invented certain new and useful Improvements in Grease-Cups; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is an elevation of grease cup applied to a shaft bearing. Fig. 2 is a sectional view of same. Fig. 3 is an elevation showing the cup applied to a crosshead.

This invention has relation to automatically controlled lubricators or grease cups for use in connection with shaft or journal bearings, and it consists in the novel construction and combination of parts as hereinafter specified.

In the accompanying drawings, the letter A designates a suitable cup or receptacle, of any suitable size or shape, which is mounted upon the box or bearing block in which is the shaft or journal which is to be lubricated.

In the drawings, the letter B designates a bearing block or box, and C a shaft turning therein.

In the bottom of the cup or receptacle A is a small passage or aperture $a$, leading to the bearing surfaces.

D is an oscillating arm having loose bearings in apertures formed in the side walls of the cup or receptacle, across which it extends diametrically, usually a short distance below the upper end of the cup. At the center of the cup, said arm or shaft is formed with a depending loop or crank $d$, to which is loosely connected a feeder or plunger F, the lower end of which works in the aperture or passage $a$. The shaft D is extended at one end outside of the cup, as shown at D', and has a depending arm or crank G, the lower end of which is in proximity to the shaft C. On said shaft C is an eccentric or cam projection H, which, as the shaft revolves, comes intermittently into contact with the arm or crank G, causing an oscillation of the shaft D in its bearings. This movement actuates the feeder F, in such a manner as to permit a quantity of oil or lubricator to pass to the bearing through the passage $a$, at each revolution of the shaft. It is of course obvious that the size of the cup and of the aperture $a$ and the feeder, will depend upon the character of the bearing, and the quantity of lubricator required. The manner of connection may also be varied somewhat from the above described, according to the character of the bearing without departing from the spirit and scope of the invention. The feeder F may also be oscillated by a connection with a wrist pin or cross head pin of an engine, as shown in Fig. 3.

Having described this invention, what we claim as new and desire to secure by Letters Patent is:

1. The herein described lubricator or grease cup, comprising the cup or receptacle having a small passage or aperture through its bottom, an oscillating crank rod or shaft D having bearings formed in the side walls of said cup or receptacle near the upper end thereof, a plunger connected to the crank $d$ of said rod or shaft within said cup, said plunger at its lower end working in said passage or aperture, and a connection between a projecting arm of said rod or shaft, and a moving part of the device to which the lubricator is applied whereby said plunger is intermittently operated, substantially as specified.

2. The combination with an oil cup or receptacle, having an oil passage or aperture through its bottom, of a plunger working in said aperture, the crank shaft to which said plunger is connected, said shaft extending transversely across within said cup or receptacle, and having bearings in the side walls thereof, the crank arm G on the projecting end of said shaft, and an eccentric portion on a moving part of the machinery arranged to intermittently oscillate said arm and shaft, substantially as specified.

In testimony whereof we affix our signatures in presence of two witnesses.

TAYLOR GLOVER.
THOMAS J. JEAN.

Witnesses:
CHARLES HYSLOP,
IRA V. MCMILLAN.